United States Patent
He

(10) Patent No.: US 10,810,369 B2
(45) Date of Patent: Oct. 20, 2020

(54) ASSISTED DATA INPUT

(71) Applicant: Alibaba Group Holding Limited, George Town (KY)

(72) Inventor: Yong He, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 201 days.

(21) Appl. No.: 15/822,438

(22) Filed: Nov. 27, 2017

(65) Prior Publication Data

US 2018/0075010 A1 Mar. 15, 2018

Related U.S. Application Data

(63) Continuation of application No. PCT/CN2016/080440, filed on Apr. 28, 2016.

(30) Foreign Application Priority Data

May 28, 2015 (CN) .......................... 2015 1 0282846

(51) Int. Cl.
 *G06F 40/232* (2020.01)
 *G06F 21/31* (2013.01)
 (Continued)

(52) U.S. Cl.
 CPC ............ *G06F 40/232* (2020.01); *G06F 21/31* (2013.01); *G06F 21/602* (2013.01);
 (Continued)

(58) Field of Classification Search
 CPC ..... G06F 40/232; G06F 21/602; H04L 9/0643
 See application file for complete search history.

(56) References Cited

U.S. PATENT DOCUMENTS 5,682,475 A * 10/1997 Johnson ................... G07C 9/33
 726/18
8,006,096 B2 8/2011 Oda
 (Continued)

FOREIGN PATENT DOCUMENTS

| CN | 103455165 | 12/2013 |
|---|---|---|
| CN | 103699233 | 4/2014 |

(Continued)

OTHER PUBLICATIONS

European Extended Search Report in European Application No. 16799186.8, dated Jan. 28, 2019, 9 pages.

(Continued)

*Primary Examiner* — Scott T Baderman
*Assistant Examiner* — Steve P Golden
(74) *Attorney, Agent, or Firm* — Fish & Richardson P.C.

(57) ABSTRACT

A piece of text is saved for security verification on a computing device. One or more pieces of related text corresponding to the piece of saved text are generated, where each text element of the one or more pieces of related text is generated based on its proximity to the corresponding text element of the piece of saved text on one or more keyboards on the computing device. A piece of input text is received for information verification. A piece of input text is compared with the piece of saved text and the one or more pieces of related text. A determination is made that the piece of input text matches one of the one or more pieces of related text and input guidance for re-entering a piece of text for security authentication is provided.

16 Claims, 2 Drawing Sheets

(51) Int. Cl.
  *G06F 40/279* (2020.01)
  *G06F 21/60* (2013.01)
  *H04L 9/06* (2006.01)
  *G06F 21/32* (2013.01)

(52) U.S. Cl.
  CPC .......... *G06F 40/279* (2020.01); *H04L 9/0643* (2013.01); *G06F 21/32* (2013.01); *G06F 2221/031* (2013.01)

(56) References Cited

U.S. PATENT DOCUMENTS

| | | | | |
|---|---|---|---|---|
| 2002/0122591 | A1* | 9/2002 | Miller | G06F 21/83 382/181 |
| 2004/0155869 | A1 | 8/2004 | Robinson et al. | |
| 2005/0169527 | A1 | 8/2005 | Longe et al. | |
| 2007/0101150 | A1* | 5/2007 | Oda | G06F 21/31 713/183 |
| 2008/0066167 | A1 | 3/2008 | Andri | |
| 2009/0210404 | A1* | 8/2009 | Wilson | G06F 16/332 |
| 2014/0129974 | A1 | 5/2014 | Ben-Harrush et al. | |
| 2014/0165169 | A1 | 6/2014 | Buck | |

FOREIGN PATENT DOCUMENTS

| | | |
|---|---|---|
| CN | 103810414 | 5/2014 |
| CN | 104331668 | 2/2015 |
| CN | 104375665 | 2/2015 |
| EP | 1217504 | 12/2001 |
| EP | 1217504 | 6/2002 |
| EP | 1693737 | 2/2005 |
| EP | 1693737 | 8/2006 |
| JP | 2000082045 | 3/2000 |
| JP | 2005038416 | 2/2005 |
| JP | 2005149388 | 6/2005 |
| JP | 2010079562 | 4/2010 |
| JP | 2010114725 | 5/2010 |
| WO | WO 2004066159 | 8/2004 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Written Opinion in Singaporean Patent Application No. 11201709536R, dated Jul. 10, 2019, 7 pages.

Search Report and Written Opinion by the Intellectual Property Office of Singapore issued in Singapore Application No. 11201709536R dated Jul. 6, 2018; 8 pages.

International Search Report by the International Searching Authority issued in International Application No. PCT/CN2016/080440 dated Aug. 17, 2016; 8 pages.

* cited by examiner

ASSISTED DATA INPUT

ASSISTED DATA INPUT

This application is a continuation of PCT Application No. PCT/CN2016/080440, filed on Apr. 28, 2016, which claims priority to Chinese Patent Application No. 201510282846.3, filed on May 28, 2015, the entire contents of which are hereby incorporated by reference.

TECHNICAL FIELD

This disclosure relates to data processing, and more particularly to processing input data.

BACKGROUND

With the development of information technologies, more types of applications can be executed on computing devices with a corresponding need for more data input (for example, text input) to run the applications. Text input is normally performed by using alphanumerical keyboards or keypads. Mistyping can happen, especially when keys are closely situated (for example, mobile devices are often smaller in size, when compared to a personal computer (PC), to allow for mobility). Their keyboards, physical or virtual, are also relatively small, which can make typing less accurate. A letter "a" can often be mistyped as the letter "s" on mobile devices due to the close proximity of the two letters on a QWERTY-type keyboard.

SUMMARY

The present disclosure describes methods and system, including computer-implemented methods, computer program products, and computer systems for assisting data input.

In an implementation, a piece of text is saved for security verification on a computing device. One or more pieces of related text corresponding to the piece of saved text are generated, where each text element of the one or more pieces of related text is generated based on its proximity to the corresponding text element of the piece of saved text on one or more keyboards on the computing device. A piece of input text is received for information verification. A piece of input text is compared with the piece of saved text and the one or more pieces of related text. A determination is made that the piece of input text matches one of the one or more pieces of related text and input guidance for re-entering a piece of text for security authentication is provided.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to improve efficiency of information verification and data input. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes technologies for assisting data input, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined herein can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

With the development of information technologies, more types of applications can be executed on computing devices with a corresponding need for more data input (for example, text input) to run the applications. Text input is normally performed by using alphanumerical keyboards or keypads. Mistyping can happen, especially when keys are closely situated (for example, mobile devices are often smaller in size, when compared to a personal computer (PC), to allow for mobility). Their keyboards, physical or virtual, are also relatively small, which can make typing less accurate. A letter "a" can often be mistyped as the letter "s" on mobile devices due to the close proximity of the two letters on a QWERTY-type keyboard.

In some implementations, the present disclosure describes technologies utilized to identify and generate text input related to text input saved on a computing device for information verification. The related texts can be generated based on a layout or configuration of one or more keyboards used for the text input of the computing device. The related text input can include text elements proximately located to the text elements saved for information verification, because they are more likely to be mistyped. When text input for information verification matches the generated related text, the computing device can provide guidance or assistance to a user to correctly re-enter the text that matches the saved text to pass the information verification.

Figure 1:
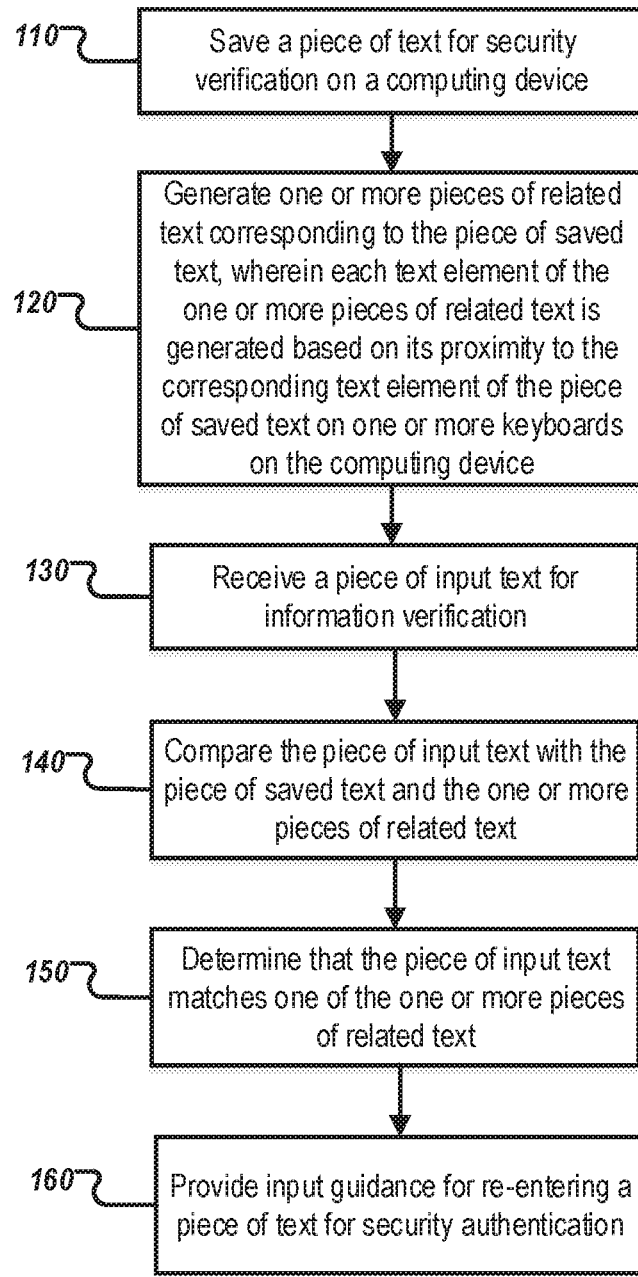
FIG. 1 is a flowchart illustrating an example of a computer-implemented method for data input verification, according to an implementation of the present disclosure.

FIG. 1 is a flowchart illustrating an example of a method 100 for data input verification, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some implementations, various steps of method 100 can be run in parallel, in combination, in loops, or in any order.

At 110, a piece of text for security verification is saved on a computing device. The piece of text can include one or more text elements, where the text elements can be in any text format, such as a letter, character, number, symbol, or sign. The piece of text can also be a password, payment card number, user identifier (ID), phone number, or other textual input data used for information verification. In some implementations, the piece of text can be plaintext or encrypted text.

Using password verification as an example, the saved piece of text can be a password set by a user from a keyboard and saved on a computing device. The computing device can be a personal computer, touch screen terminal, workstation, network computer, kiosk, wireless data port, smart phone, tablet, personal data assistant (PDA), or any other suitable computing devices that supports data input. The keyboard can be a physical or virtual keyboard, keypad, or any other textual input interface.

The piece of text can be saved as plaintext or converted to other formats to be saved. In some cases, a piece of text input as plaintext can be encrypted using an encryption algorithm before being saved. For example, a Hash-type algorithm can be used to encrypt a letter "x" to a HASH encrypted text element represented by H(x). From 110, method 100 proceeds to 120.

At 120, one or more pieces of related text corresponding to the piece of saved text are generated, each text element of the one or more pieces of related text is generated based on its proximity to the corresponding text element of the piece of saved text on one or more keyboards on the computing device. In some cases, each of the one or more pieces of related text can have the same number of text elements as the saved piece of text. Each text element of each of the one or more pieces of related text can have a one-to-one correspondence with the saved piece of text. As discussed earlier, the one or more keyboards can be physical or virtual keyboards, keypads, or any other text input interfaces suitable for performing text input. The keys that are located closer to the key corresponding to the intended text element are more likely to be mistyped. As such, the text elements of the one or more pieces of related text can be generated based on their geographical proximity to the corresponding saved text element.

For example, using a QWERTY keyboard, "a" is a text element of a saved piece of text "x," the letters "q," "w," "s," "x," or "z" can be related text elements corresponding to "a," generated for ith related text, "xi," of the one or more pieces of related text. If the number "1" is a text element of the saved piece of text "x," the numbers proximate to "1" on a keypad, such as "0," "2," and "4" can be generated as related text elements for the one or more pieces of related text. Accordingly, if the saved piece of text "x" is "abc123," example pieces of related text can be, for example, "qbc023" and "sbc423.". It can be understood that other text elements of "x" can be similarly generated based on the keyboard configuration or layout.

The proximity of the related text elements can be determined based on the keyboards available to the computing device. For example, if the computing device is a PC, the one or more keyboards can include a "QWERTY" keyboard for letter and symbol input and a keypad for number input. If the computing device is a touchscreen smartphone, the keyboard can be a default virtual keyboard or a keyboard selected by a user for data input. Moreover, the number of pieces of related text generated for a PC or a tablet may be lower than those generated for a smartphone, because the possibility that a key is mistyped using a PC or tablet keyboard is lower than that of a smartphone due to larger keyboard sizes. In other words, fewer related text elements may be generated for a corresponding saved text element for data input on computing devices with larger keyboards because their keys are farther apart from one another.

In some cases, the proximity for generating the related text element can be determined by the user of the computing device. For example, a user can set the proximity as four adjacent keys when the keyboard is small, and set the proximity as two adjacent keys when the keyboard is large.

In some cases, the piece of related text "x'" can be encrypted. Using HASH encryption for example, the encrypted piece of related text can be represented by H(xi). From 120, method 100 proceeds to 130.

At 130, a piece of input text is received for information verification. The piece of input text can be input by a user of the computing device for information verification such as logging into an account, entering payment information, contact information, etc. From 130, method 100 proceeds to 140.

At 140, the piece of input text is compared with the piece of saved text and the one or more pieces of related text. If the saved piece of text is in a plaintext form, the piece of input text can be directly compared with the piece of saved text. If the input piece of text matches the saved piece of text, the verification is successful. If the input piece of text does not match the saved piece of text or any of the one or more pieces of related text, the verification fails.

If the saved piece of text is encrypted, the input piece of text can be encrypted using the same encryption algorithm and compared to the encrypted saved piece of text. For example, if the saved piece of text is represented by "x," and the related text is represented by "xi". The saved piece of text and the related text are encrypted based on HASH encryption, an input piece of text "x'" can be HASH encrypted as H(x') before comparing with the HASH encrypted saved piece of text H(x) or the related text H(xi). From 140, method 100 proceeds to 150.

At 150, the piece of input text is determined to match one of the one or more pieces of related text. As discussed in the description of step 140, if the input piece of text matches the saved piece of text, the verification is successful. If the input piece of text does not match the saved piece of text or any of the one or more pieces of related text, the verification fails. Method 100 proceeds from 150 to 160 when the piece of input text is determined to match one of the one or more pieces of related text.

At 160, input guidance is provided for re-entering a piece of text for security authentication. The input guidance can have different forms. For example, the input guidance can be a prompt notification to a user notifying that one or more text elements are mistyped, or the user need to pay attention with typing.

In some cases, the input guidance may be an extension of time for showing a piece of input text (for example, a password) in plaintext before masking it (for example, using "*" to replace an input text element) for security. The extension of time can be applied to the entire re-entered piece of text or only one or more previously input text elements that do not match the corresponding saved text elements but match the corresponding related text elements.

In some cases, the input guidance can also be directly displaying the input piece of text (for example, a password) in plaintext without masking it if the previous input matches one of the one or more pieces of related text. The entire re-entered piece of text can be shown in plaintext or only the one or more previously input text elements that do not match the corresponding saved text elements but match the corresponding related text elements, may be shown in plaintext. After 160, method 100 stops.

Figure 2:
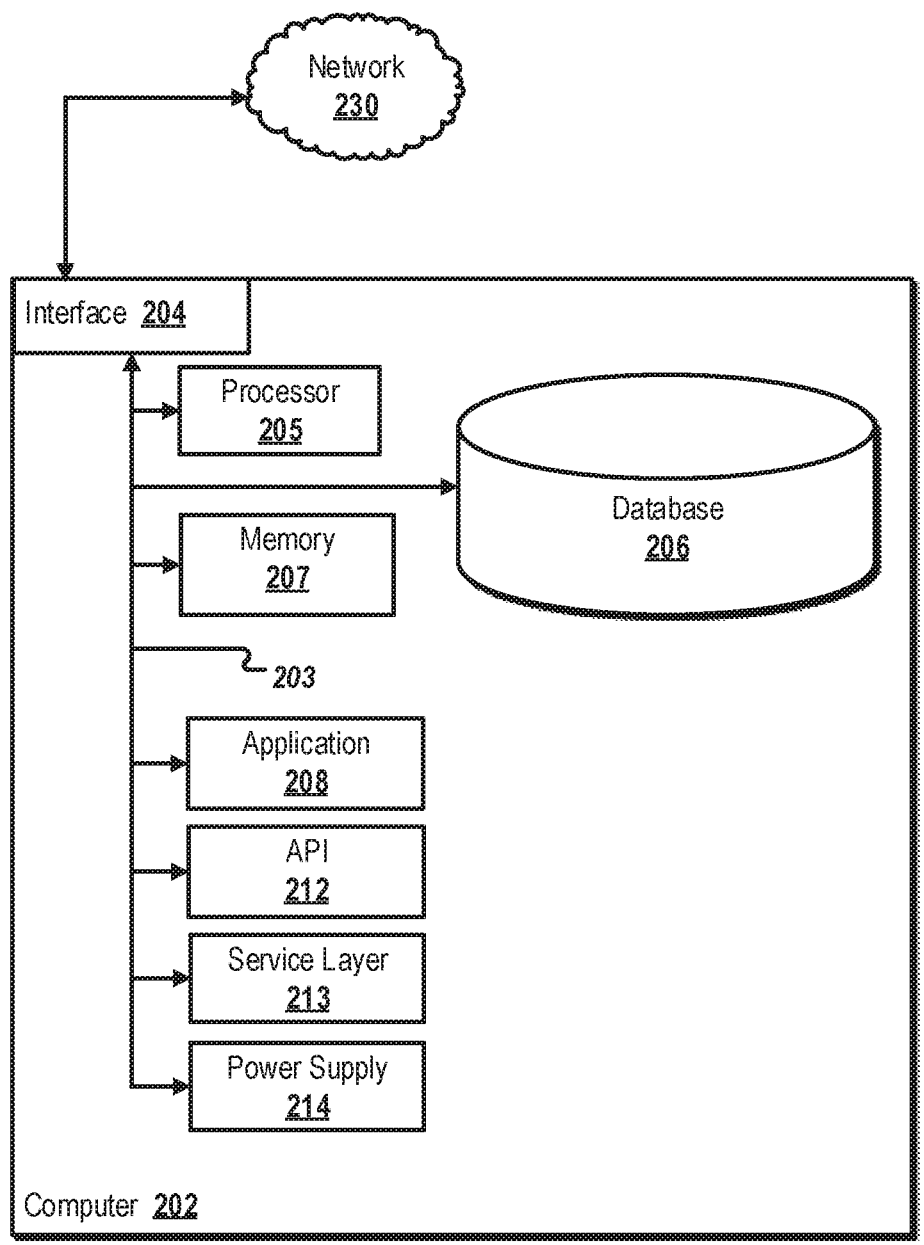
FIG. 2 is a block diagram illustrating an example of a computer-implemented system used to provide computational functionalities associated with described algorithms, methods, functions, processes, flows, and procedures, according to an implementation of the present disclosure.

FIG. 2 is a block diagram illustrating an example 200 of a computer-implemented System 200 used to provide computational functionalities associated with described algorithms, methods, functions, processes, flows, and procedures, according to an implementation of the present disclosure. In the illustrated implementation, System 200 includes a Computer 202 and a Network 230.

The illustrated Computer 202 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 202 can include an input device, such as a keypad, keyboard, touch screen, another input device, or a combination of input devices that can accept user information, and an output device that conveys information associated with the operation of the Computer 202, including digital data, visual, audio, another type of information, or a combination of types of information, on a graphical-type user interface (UI) (or GUI) or other UI.

The Computer 202 can serve in a role in a distributed computing system as a client, network component, a server, a database or another persistency, another role, or a combination of roles for performing the subject matter described in the present disclosure. The illustrated Computer 202 is communicably coupled with a Network 230. In some implementations, one or more components of the Computer 202 can be configured to operate within an environment, including cloud-computing-based, local, global, another environment, or a combination of environments.

At a high level, the Computer 202 is an electronic computing device operable to receive, transmit, process, store, or manage data and information associated with the described subject matter. According to some implementations, the Computer 202 can also include or be communicably coupled with a server, including an application server, e-mail server, web server, caching server, streaming data server, another server, or a combination of servers.

The Computer 202 can receive requests over Network 230 (for example, from a client software application executing on another Computer 202) and respond to the received requests by processing the received requests using a software application or a combination of software applications. In addition, requests can also be sent to the Computer 202 from internal users (for example, from a command console or by another internal access method), external or third-parties, or other entities, individuals, systems, or computers.

Each of the components of the Computer 202 can communicate using a System Bus 203. In some implementations, any or all of the components of the Computer 202, including hardware, software, or a combination of hardware and software, can interface over the System Bus 203 using an application programming interface (API) 212, a Service Layer 213, or a combination of the API 212 and Service Layer 213. The API 212 can include specifications for routines, data structures, and object classes. The API 212 can be either computer-language independent or dependent and refer to a complete interface, a single function, or even a set of APIs. The Service Layer 213 provides software services to the Computer 202 or other components (whether illustrated or not) that are communicably coupled to the Computer 202. The functionality of the Computer 202 can be accessible for all service consumers using the Service Layer 213. Software services, such as those provided by the Service Layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 202, alternative implementations can illustrate the API 212 or the Service Layer 213 as stand-alone components in relation to other components of the Computer 202 or other components (whether illustrated or not) that are communicably coupled to the Computer 202. Moreover, any or all parts of the API 212 or the Service Layer 213 can be implemented as a child or a sub-module of another software module, enterprise application, or hardware module without departing from the scope of the present disclosure.

The Computer 202 includes an Interface 204. Although illustrated as a single Interface 204, two or more Interfaces 204 can be used according to particular needs, desires, or particular implementations of the Computer 202. The Interface 204 is used by the Computer 202 for communicating with another computing system (whether illustrated or not) that is communicatively linked to the Network 230 in a distributed environment. Generally, the Interface 204 is operable to communicate with the Network 230 and includes logic encoded in software, hardware, or a combination of software and hardware. More specifically, the Interface 204 can include software supporting one or more communication protocols associated with communications such that the Network 230 or hardware of Interface 204 is operable to communicate physical signals within and outside of the illustrated Computer 202.

The Computer 202 includes a Processor 205. Although illustrated as a single Processor 205, two or more Processors 205 can be used according to particular needs, desires, or particular implementations of the Computer 202. Generally, the Processor 205 executes instructions and manipulates data to perform the operations of the Computer 202 and any algorithms, methods, functions, processes, flows, and procedures as described in the present disclosure.

The Computer 202 also includes a Database 206 that can hold data for the Computer 202, another component communicatively linked to the Network 230 (whether illustrated or not), or a combination of the Computer 202 and another component. For example, Database 206 can be an in-memory, conventional, or another type of database storing data consistent with the present disclosure. In some implementations, Database 206 can be a combination of two or more different database types (for example, a hybrid in-memory and conventional database) according to particular needs, desires, or particular implementations of the Computer 202 and the described functionality. Although illustrated as a single Database 206, two or more databases of similar or differing types can be used according to particular needs, desires, or particular implementations of the Computer 202 and the described functionality. While Database 206 is illustrated as an integral component of the Computer 202, in alternative implementations, Database 206 can be external to the Computer 202.

The Computer 202 also includes a Memory 207 that can hold data for the Computer 202, another component or components communicatively linked to the Network 230 (whether illustrated or not), or a combination of the Computer 202 and another component. Memory 207 can store any data consistent with the present disclosure. In some implementations, Memory 207 can be a combination of two or more different types of memory (for example, a combination of semiconductor and magnetic storage) according to particular needs, desires, or particular implementations of the Computer 202 and the described functionality. Although illustrated as a single Memory 207, two or more Memories 207 or similar or differing types can be used according to particular needs, desires, or particular implementations of the Computer 202 and the described functionality. While Memory 207 is illustrated as an integral component of the Computer 202, in alternative implementations, Memory 207 can be external to the Computer 202.

The Application 208 is an algorithmic software engine providing functionality according to particular needs, desires, or particular implementations of the Computer 202, particularly with respect to functionality described in the present disclosure. For example, Application 208 can serve as one or more components, modules, or applications. Further, although illustrated as a single Application 208, the Application 208 can be implemented as multiple Applications 208 on the Computer 202. In addition, although illustrated as integral to the Computer 202, in alternative implementations, the Application 208 can be external to the Computer 202.

The Computer 202 can also include a Power Supply 214. The Power Supply 214 can include a rechargeable or non-rechargeable battery that can be configured to be either user- or non-user-replaceable. In some implementations, the Power Supply 214 can include power-conversion or management circuits (including recharging, standby, or another power management functionality). In some implementations, the Power Supply 214 can include a power plug to allow the Computer 202 to be plugged into a wall socket or another power source to, for example, power the Computer 202 or recharge a rechargeable battery.

There can be any number of Computers 202 associated with, or external to, a computer system containing Computer 202, each Computer 202 communicating over Network 230. Further, the term "client," "user," or other appropriate terminology can be used interchangeably, as appropriate, without departing from the scope of the present disclosure. Moreover, the present disclosure contemplates that many users can use one Computer 202, or that one user can use multiple computers 202.

Described implementations of the subject matter can include one or more features, alone or in combination.

For example, in a first implementation, a computer-implemented method, comprising: saving a piece of text for security verification on a computing device; generating one or more pieces of related text corresponding to the piece of saved text, wherein each text element of the one or more pieces of related text is generated based on its proximity to the corresponding text element of the piece of saved text on one or more keyboards on the computing device; receiving a piece of input text for information verification; comparing the piece of input text with the piece of saved text and the one or more pieces of related text; determining that the piece of input text matches one of the one or more pieces of related text; and providing input guidance for re-entering a piece of text for security authentication.

The foregoing and other described implementations can each, optionally, include one or more of the following features:

A first feature, combinable with any of the following features, wherein the piece of text includes one or more text elements, wherein the one or more text elements includes at least one of a letter, a character, a symbol, a number, or a sign.

A second feature, combinable with any of the previous or following features, wherein each text element of the one or more pieces of related text is proximate to the corresponding text element of the piece of saved text based on a layout of keys of each of the corresponding one or more keyboards.

A third feature, combinable with any of the previous or following features, wherein the piece of re-entered text is masked for security after showing as plaintext for a predetermined period of time and the input guidance is an extension of the predetermined period of time for showing the piece of re-entered text in plaintext before masking.

A fourth feature, combinable with any of the previous or following features, wherein the extension of the predetermined period of time for showing the piece of re-entered text includes showing one or more text elements of the piece of input text that match the corresponding text elements of the one of the one or more pieces of related text with an extension of time and showing other text elements of the of piece of re-entered text with the predetermined period of time.

A fifth feature, combinable with any of the previous or following features, wherein one or more text elements of the re-entered text are shown as plaintext when the corresponding one or more text elements of the piece of input text match the corresponding text elements of the one of the one or more pieces of related text and other text elements of the piece of re-entered text are masked after showing as plaintext for a predetermined period of time.

A sixth feature, combinable with any of the previous or following features, further comprising: encrypting the saved piece of text, the one or more pieces of related text and the piece of input text using the same encryption algorithm; and wherein comparing the piece of input text with the piece of saved text and the one or more pieces of related text includes comparing the encrypted piece of input text with the encrypted piece of saved text and encrypted one or more pieces of related text.

A seventh feature, combinable with any of the previous or following features, wherein the one or more keyboards can include at least one of a physical keyboard, a physical keypad, a virtual keyboard, or a virtual keypad.

A eighth feature, combinable with any of the previous or following features, wherein the input guidance is a prompt notification notifying that one or more text elements are mistyped.

In a second implementation, a non-transitory, computer-readable medium storing one or more instructions executable by a computer system to perform operations comprising: saving a piece of text for security verification on a computing device; generating one or more pieces of related text corresponding to the piece of saved text, wherein each text element of the one or more pieces of related text is generated based on its proximity to the corresponding text element of the piece of saved text on one or more keyboards on the computing device; receiving a piece of input text for information verification; comparing the piece of input text with the piece of saved text and the one or more pieces of related text; determining that the piece of input text matches one of the one or more pieces of related text; and providing input guidance for re-entering a piece of text for security authentication.

The foregoing and other described implementations can each, optionally, include one or more of the following features:

A first feature, combinable with any of the following features, wherein the piece of text includes one or more text elements, wherein the one or more text elements includes at least one of a letter, a character, a symbol, a number, or a sign.

A second feature, combinable with any of the previous or following features, wherein each text element of the one or more pieces of related text is proximate to the corresponding text element of the piece of saved text based on a layout of keys of each of the corresponding one or more keyboards.

A third feature, combinable with any of the previous or following features, wherein the piece of re-entered text is masked for security after showing as plaintext for a predetermined period of time and the input guidance is an extension of the predetermined period of time for showing the piece of re-entered text in plaintext before masking.

A fourth feature, combinable with any of the previous or following features, wherein the extension of the predetermined period of time for showing the piece of re-entered text includes showing one or more text elements of the piece of input text that match the corresponding text elements of the one of the one or more pieces of related text with an extension of time and showing other text elements of the of piece of re-entered text with the predetermined period of time.

A fifth feature, combinable with any of the previous or following features, wherein one or more text elements of the re-entered text are shown as plaintext when the corresponding one or more text elements of the piece of input text match the corresponding text elements of the one of the one or more pieces of related text and other text elements of the piece of re-entered text are masked after showing as plaintext for a predetermined period of time.

A sixth feature, combinable with any of the previous or following features, further comprising: encrypting the saved piece of text, the one or more pieces of related text and the piece of input text using the same encryption algorithm; and wherein comparing the piece of input text with the piece of saved text and the one or more pieces of related text includes comparing the encrypted piece of input text with the encrypted piece of saved text and encrypted one or more pieces of related text.

A seventh feature, combinable with any of the previous or following features, wherein the one or more keyboards can include at least one of a physical keyboard, a physical keypad, a virtual keyboard, or a virtual keypad.

A eighth feature, combinable with any of the previous or following features, wherein the input guidance is a prompt notification notifying that one or more text elements are mistyped.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform operations comprising: saving a piece of text for security verification on a computing device; generating one or more pieces of related text corresponding to the piece of saved text, wherein each text element of the one or more pieces of related text is generated based on its proximity to the corresponding text element of the piece of saved text on one or more keyboards on the computing device; receiving a piece of input text for information verification; comparing the piece of input text with the piece of saved text and the one or more pieces of related text; determining that the piece of input text matches one of the one or more pieces of related text; and providing input guidance for re-entering a piece of text for security authentication.

The foregoing and other described implementations can each, optionally, include one or more of the following features:

A first feature, combinable with any of the following features, wherein the piece of text includes one or more text elements, wherein the one or more text elements includes at least one of a letter, a character, a symbol, a number, or a sign.

A second feature, combinable with any of the previous or following features, wherein each text element of the one or more pieces of related text is proximate to the corresponding text element of the piece of saved text based on a layout of keys of each of the corresponding one or more keyboards.

A third feature, combinable with any of the previous or following features, wherein the piece of re-entered text is masked for security after showing as plaintext for a predetermined period of time and the input guidance is an extension of the predetermined period of time for showing the piece of re-entered text in plaintext before masking.

A fourth feature, combinable with any of the previous or following features, wherein the extension of the predetermined period of time for showing the piece of re-entered text includes showing one or more text elements of the piece of input text that match the corresponding text elements of the one of the one or more pieces of related text with an extension of time and showing other text elements of the of piece of re-entered text with the predetermined period of time.

A fifth feature, combinable with any of the previous or following features, wherein one or more text elements of the re-entered text are shown as plaintext when the corresponding one or more text elements of the piece of input text match the corresponding text elements of the one of the one or more pieces of related text and other text elements of the piece of re-entered text are masked after showing as plaintext for a predetermined period of time.

A sixth feature, combinable with any of the previous or following features, further comprising: encrypting the saved piece of text, the one or more pieces of related text and the piece of input text using the same encryption algorithm; and wherein comparing the piece of input text with the piece of saved text and the one or more pieces of related text includes comparing the encrypted piece of input text with the encrypted piece of saved text and encrypted one or more pieces of related text.

A seventh feature, combinable with any of the previous or following features, wherein the one or more keyboards can include at least one of a physical keyboard, a physical keypad, a virtual keyboard, or a virtual keypad.

A eighth feature, combinable with any of the previous or following features, wherein the input guidance is a prompt notification notifying that one or more text elements are mistyped.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
  saving a piece of text for security verification on a computing device;
  generating one or more pieces of related text corresponding to the piece of saved text, wherein each text element of the one or more pieces of related text is generated based on its proximity to the corresponding text element of the piece of saved text on one or more keyboards on the computing device;
  receiving a piece of input text for information verification;
  comparing the piece of input text with the piece of saved text and the one or more pieces of related text;
  determining that the piece of input text matches one of the one or more pieces of related text; and
  providing input guidance for re-entering a piece of text for security authentication,
  wherein the piece of re-entered text is masked for security after showing as plaintext for a predetermined period of time, wherein the input guidance is an extension of the predetermined period of time for showing the piece of re-entered text in plaintext before masking, and wherein the extension of the predetermined period of time for showing the piece of re-entered text includes showing one or more text elements of the piece of input text that do not match the corresponding text elements of the piece of saved text, but match the corresponding text elements of the one of the one or more pieces of related text with an extension of time and showing other text elements of the of piece of re-entered text with the predetermined period of time.

2. The computer-implemented method of claim 1, wherein the piece of text includes one or more text elements, wherein the one or more text elements includes at least one of a letter, a character, a symbol, a number, or a sign.

3. The computer-implemented method of claim 2, wherein each text element of the one or more pieces of related text is proximate to the corresponding text element of the piece of saved text based on a layout of keys of each of the corresponding one or more keyboards.

4. The computer-implemented method of claim 2, wherein one or more text elements of the re-entered text are shown as plaintext when the corresponding one or more text elements of the piece of input text match the corresponding text elements of the one of the one or more pieces of related text and other text elements of the piece of re-entered text are masked after showing as plaintext for a predetermined period of time.

5. The computer-implemented method of claim 1, further comprising:
  encrypting the saved piece of text, the one or more pieces of related text and the piece of input text using the same encryption algorithm; and
  wherein comparing the piece of input text with the piece of saved text and the one or more pieces of related text includes comparing the encrypted piece of input text with the encrypted piece of saved text and encrypted one or more pieces of related text.

6. The computer-implemented method of claim 1, wherein the one or more keyboards can include at least one of a physical keyboard, a physical keypad, a virtual keyboard, or a virtual keypad.

7. The computer-implemented method of claim 1, wherein the input guidance is a prompt notification notifying that one or more text elements are mistyped.

8. A non-transitory, computer-readable medium storing one or more instructions executable by a computer system to perform operations comprising:
  saving a piece of text for security verification on a computing device;
  generating one or more pieces of related text corresponding to the piece of saved text, wherein each text element of the one or more pieces of related text is generated based on its proximity to the corresponding text element of the piece of saved text on one or more keyboards on the computing device;
  receiving a piece of input text for information verification;
  comparing the piece of input text with the piece of saved text and the one or more pieces of related text;
  determining that the piece of input text matches one of the one or more pieces of related text; and
  providing input guidance for re-entering a piece of text for security authentication,
  wherein the piece of re-entered text is masked for security after showing as plaintext for a predetermined period of time, wherein the input guidance is an extension of the predetermined period of time for showing the piece of re-entered text in plaintext before masking, and wherein the extension of the predetermined period of time for showing the piece of re-entered text includes showing one or more text elements of the piece of input text that do not match the corresponding text elements of the piece of saved text, but match the corresponding text elements of the one of the one or more pieces of related text with an extension of time and showing other text elements of the of piece of re-entered text with the predetermined period of time.

9. The non-transitory, computer-readable medium of claim 8, wherein the piece of text includes one or more text elements, wherein the one or more text elements includes at least one of a letter, a character, a symbol, a number, or a sign.

10. The non-transitory, computer-readable medium of claim 9, wherein each text element of the one or more pieces of related text is proximate to the corresponding text element of the piece of saved text based on a layout of keys of each of the corresponding one or more keyboards.

11. The non-transitory, computer-readable medium of claim 9, wherein one or more text elements of the re-entered text are shown as plaintext when the corresponding one or more text elements of the piece of input text match the corresponding text elements of the one of the one or more pieces of related text and other text elements of the piece of re-entered text are masked after showing as plaintext for a predetermined period of time.

12. The non-transitory, computer-readable medium of claim 8, further comprising:
  encrypting the saved piece of text, the one or more pieces of related text and the piece of input text using the same encryption algorithm; and wherein comparing the piece of input text with the piece of saved text and the one or more pieces of related text includes comparing the encrypted piece of input text with the encrypted piece of saved text and encrypted one or more pieces of related text.

13. The non-transitory, computer-readable medium of claim 8, wherein the one or more keyboards can include at least one of a physical keyboard, a physical keypad, a virtual keyboard, or a virtual keypad.

14. The non-transitory, computer-readable medium of claim 8, wherein the input guidance is a prompt notification notifying that one or more text elements are mistyped.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
  saving a piece of text for security verification on a computing device;
  generating one or more pieces of related text corresponding to the piece of saved text, wherein each text element of the one or more pieces of related text is generated based on its proximity to the corresponding text element of the piece of saved text on one or more keyboards on the computing device;
  receiving a piece of input text for information verification;
  comparing the piece of input text with the piece of saved text and the one or more pieces of related text;
  determining that the piece of input text matches one of the one or more pieces of related text; and
  providing input guidance for re-entering a piece of text for security authentication,
  wherein the piece of re-entered text is masked for security after showing as plaintext for a predetermined period of time, wherein the input guidance is an extension of the predetermined period of time for showing the piece of re-entered text in plaintext before masking, and wherein the extension of the predetermined period of time for showing the piece of re-entered text includes showing one or more text elements of the piece of input text that do not match the corresponding text elements of the piece of saved text, but match the corresponding text elements of the one of the one or more pieces of related text with an extension of time and showing other text elements of the of piece of re-entered text with the predetermined period of time.

16. The computer-implemented system of claim 15, wherein the piece of text includes one or more text elements, wherein the one or more text elements includes at least one of a letter, a character, a symbol, a number, or a sign.

\* \* \* \* \*